(12) United States Patent
Kean

(10) Patent No.: US 8,827,032 B1
(45) Date of Patent: Sep. 9, 2014

(54) APPARATUS AND METHOD FOR ATTENUATING SOUND GENERATED BY MACHINERY

(71) Applicant: Tod M. Kean, Chandler, AZ (US)

(72) Inventor: Tod M. Kean, Chandler, AZ (US)

( * ) Notice: Subject to any disclaimer, the term of this patent is extended or adjusted under 35 U.S.C. 154(b) by 0 days.

(21) Appl. No.: 13/911,851

(22) Filed: Jun. 6, 2013

Related U.S. Application Data

(60) Provisional application No. 61/656,657, filed on Jun. 7, 2012.

(51) Int. Cl.
 *H02K 5/24* (2006.01)
(52) U.S. Cl.
 USPC ............ 181/202; 181/201; 181/200; 181/198
(58) Field of Classification Search
 CPC ..... G10K 11/02; G10K 11/16; G10K 11/168; H02K 5/24
 USPC .................................. 181/200, 201, 202, 198
 See application file for complete search history.

(56) References Cited

U.S. PATENT DOCUMENTS

| | | | | |
|---|---|---|---|---|
| 5,274,200 A * | 12/1993 | Das et al. | ....................... | 181/202 |
| 7,357,219 B2 * | 4/2008 | Mafi et al. | ..................... | 181/202 |
| 7,398,855 B2 * | 7/2008 | Seel | .............................. | 181/202 |
| 8,061,475 B2 * | 11/2011 | Mori et al. | .................... | 181/205 |
| 8,657,066 B2 * | 2/2014 | Doneker et al. | ............. | 181/290 |
| 2010/0224442 A1* | 9/2010 | Sanders | ........................ | 181/294 |
| 2013/0112499 A1* | 5/2013 | Kitchen et al. | ................ | 181/296 |

* cited by examiner

*Primary Examiner* — Forrest M Phillips
(74) *Attorney, Agent, or Firm* — Cahill Glazer PLC

(57) ABSTRACT

Apparatus and method for attenuating sound generated by machinery is disclosed and is particularly relevant to noises and sounds emanating from domestic appliances such as dishwashers. The enclosure of the dishwasher is lined with a sound absorbing material which includes holes or openings therein to permit the extension of portions of the appliance's apparatus or equipment mounted within the enclosure to be positioned closer to the interior surface of the enclosure than to an interior surface of the absorbing material. Caps are formed of material having the same recipe as the absorbing material but having a different density and which are compressed, heated, and subsequently placed over said openings to completely enclose the machinery and equipment within the appliance enclosure.

6 Claims, 2 Drawing Sheets

APPARATUS AND METHOD FOR ATTENUATING SOUND GENERATED BY MACHINERY

RELATED APPLICATIONS

This application is related to and claims priority to a provisional application entitled "APPARATUS AND METHOD FOR ATTENUATING SOUND GENERATED BY MACHINERY" filed Jun. 7, 2012, and assigned Ser. No. 61/656,657.

FIELD OF THE INVENTION

The present invention relates to sound attenuation, and particularly with respect to attenuating sound generated by electric motors and associated machinery found in electrically powered equipment such as domestic appliances and the like.

BACKGROUND OF THE INVENTION

In the utilization of machinery or apparatus, such as electric motors and equipment being driven thereby, it is frequently necessary to provide sound insulation to reduce the sound level emanating from the location of such equipment. To reduce the sound level, it is common practice to provide sound insulation material encasing or surrounding the source of the undesirable acoustic radiation. The insulation material may take the form of a molded sound-absorbing material having appropriate acoustic absorption characteristics. The use of such molded acoustic barriers generally requires molding techniques employing molds and processes to produce the sound absorbing acoustic barrier. Molded acoustic barriers also dictate the requirement of materials that may not have the desirable acoustic dampening characteristics; the requirement for molds and processing equipment also renders the molded acoustic barrier expensive and militates against modification or changes that require modified or new molds or processes.

A less expensive technique is the utilization of flat sheets or webs of acoustically absorbent material that is cut into various shapes to conform to an enclosure for surrounding the noise generating machinery. This latter technique is less expensive and does not require the creation of molds or the use of molding techniques to provide the necessary acoustic dampening.

SUMMARY OF THE INVENTION

The present invention is directed to the latter technique wherein a sheet of fibrous acoustic insulating material is cut into appropriate forms and secured to the interior of an enclosure encompassing the noise producing equipment. The present invention is useful in numerous applications including, commercial applications such as large office printers, domestic appliances such as dishwashers, refrigerators, washing machines and the like and commercial applications such as heating/ventilation motors and blowers.

In each of these applications, the noise producing element, such as an electric motor and connected apparatus, is confined to a designated volume within the overall operating system. It is typical to provide an enclosure encompassing the noise producing elements and to provide a sound deadening or acoustic absorbing lining at the interior surfaces of the enclosure. However, the permissible volume occupied by the enclosure is usually dictated by overall application parameters such as available space and the usual desire to minimize the volume occupied by such noise producing apparatus and devices.

BRIEF DESCRIPTION OF THE DRAWINGS

The present invention may more readily be described by reference to the accompanying drawings in which.

DETAILED DESCRIPTION OF THE INVENTION

Figure 1:
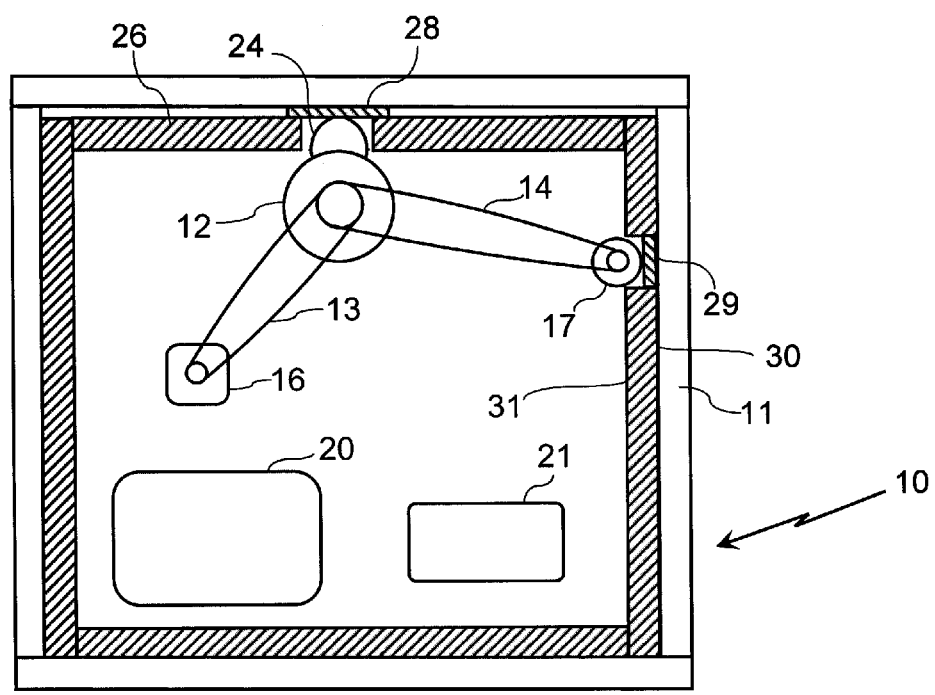
FIG. 1 is a schematic representation of an electric motor and associated equipment contained within the enclosure of a household appliance.

Referring to FIG. 1, a schematic representation of an electric motor and miscellaneous noise producing operating devices positioned within an enclosure. As indicated previously, the volume occupied by this enclosure is dictated by extraneous system design requirements which usually require the minimization of the volume.

The interior of the enclosure is provided with sound deadening or acoustic absorbing material to substantially reduce the level of the acoustic waves emanating from the enclosure. However, the equipment being enclosed within the enclosure frequently is formed having a shape including portions thereof that may require a volume greater than that provided by the acoustic material lined enclosure. To accommodate these equipment idiosyncrasies that require additional volume, a typical design compromise simply dictates the removal of the acoustic lining within the enclosure to the extent necessary to accommodate the extending portion of the sound producing equipment. Thus, the end product of this modification would be the sound or noise producing equipment being positioned within the enclosure, the enclosure having an acoustic dampening lining except for that portion surrounding the extended equipment portion. Sound deadening or acoustic dampening would thus not be provided throughout the area where the sound deadening material has been removed thus permitting the propagation of acoustic waves (noise) from the "opening" in the acoustic material. Nevertheless, even with this undesirable opening in the acoustic lining of the enclosure, the noise is substantially reduced from the level that would exist without the enclosure and acoustic lining.

The present invention is directed to the above described problem presented by equipment to be enclosed that requires a volume greater than the designated enclosure. That is, portions of the equipment may intrude on that space that was originally designated for the sound-deadening or acoustically absorbent lining. For example, in an appliance such as a dishwasher, the outside dimensions of the apparatus are dictated by generally standardized dimensions to permit the device to be included with the acceptable architectural parameters of the room in which the device is to be located. These outside dimensions are therefore a limiting factor on the size of the enclosure and therefore on the availability of and thickness of sound deadening or insulation material.

The present invention incorporates the utilization of a fibrous web or sheet. The sheet or web is a bi-component fiber comprising approximately 80% of a natural fiber such as cotton, and approximately 20% of a binder fiber such as polyester. The cotton fiber is provided with a fire retardant in sufficient concentration that when the cotton or natural fiber is combined with the binder fiber the resulting bi-component fiber contains a sufficient quantity of fire retardant material to provide an appropriate level of fire retardant for the intended application. For example, the chosen fire retardant material is an ammonium sulfate/boric acid/urea combination applied to the natural fiber such as cotton. It has been found that the fire retardant may contain 25% to 75% ammonium sulfate, 10% to 30% boric acid, and 10% to 30% urea. As stated previously, the amount of the fire retardant combined with the natural fiber such as cotton is sufficient that, when combined with the binder fiber such as polyester, produces an LOI index of at least 24. The latter index conforms to the Limiting Oxygen Index determined by standardized procedure identified in ASTM D2863. The index of 24 is applicable to regulations for fiber insulation used in residential housing; however, the index may vary depending on the application of the sheet or web.

The thickness of the acoustic insulation sheet, and the weight per spare foot, is determined by the required level of acoustic attenuation and the space available for the sheet. In a preferred embodiment particularly designed for household dishwasher appliances the sheet thickness was chosen at 20 mm weighing approximately 105 grams/square foot. The enclosure acoustic lining is then provided as indicated above with the opening provided for that portion of the machinery intruding into the space normally occupied by the insulation. To cover the opening and attenuate acoustic waves propagating from that opening, the opening is covered by a thin cap of the identical recipe sheet material, but having lower weight per square foot, that has been compressed to a permanently thinner profile to accommodate the extending machinery portion without requiring an enlargement of the enclosure. In the preferred embodiment the cap is formed by compressing sheet material having the same constituents and recipe as the acoustic lining but a lower weight per square foot. The cap is formed from a sheet approximately 38 mm thick, weighing approximately 44 grams/square foot, and compressed to 4 mm thickness. The sheet is compressed and maintained in its compressed state during the application of heat. In the preferred embodiment, the sheet is compressed from about 38 mm to 4 mm thickness and maintained in the compressed state during application of heat at approximately 350° F. to 400° F. for one to three minutes, followed by cooling to below approximately 265° F. The heat causes a change of state in the binding fiber such as polyester and causes the latter to flow throughout the fibers. The compressive pressures maintained while the sheet is cooled to permit the compressed sheet to maintain its compressed dimensions when the compressive force is removed.

The compressed sheet may be dimensioned to cover the opening previously provided to accommodate the extended or protruding machinery portion and is cemented to adjacent insulating material. It has been found that the acoustic attenuation provided by such compressed fibrous sheet adequately reduces the propagation of objectionable sound waves and greatly improves noise reduction of the enclosed machinery compared to the same machinery enclosed with similar acoustic lining but having openings therein to accommodate extending machine portions.

Figure 2:
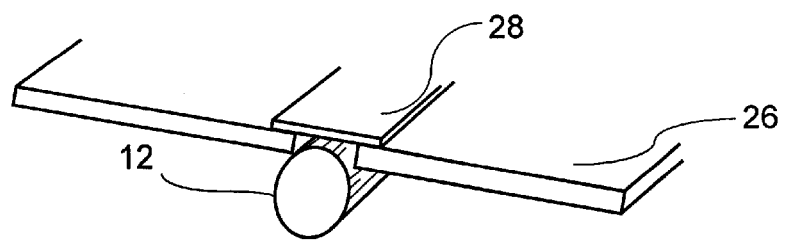
FIG. 2 is a schematic representation of a portion of FIG. 1 useful in describing the positioning of various elements of the system of FIG. 1.

Referring to FIGS. 1 and 2, a schematic representation of an enclosure for containing various mechanical operating parts of a domestic appliance such as a dishwasher is shown. The enclosure 10 is limited by the space available as indicated above and depends on the space available for the appliance and the environment in which the appliance is to be placed. The enclosure is provided with an acoustic absorbent material liner 26 as described above generally contacting the interior surface 30 of the enclosure 10. The mechanical components within the enclosure may take a variety of forms; in FIG. 1 the schematic representation of an electric motor 12 is shown having a sheave or pulley driving a pair of belts 13 and 14 which drive accessory components 16 and 17. A variety of the mechanical and control components may be contained throughout the enclosure and are schematically represented by elements 20 and 21. As indicated previously, the complexity and number of mechanical components within the enclosure depend on the system's application. However, in many applications a portion of the machinery or apparatus cannot be contained within the interior surface 31 of the acoustic absorbent material liner 26. For example, the electric motor is shown having a component 24 that extends into the space normally occupied by the sound absorbing lining 26. Similarly, device 17 is required to be mounted close to the enclosure wall 11 thus requiring removal of a portion of the acoustic lining. In either of the above cases, an opening is provided in the acoustic lining to accommodate the extending parts; however, such openings permit the propagation of sound waves emanating from the machinery within the enclosure.

There is insufficient space within the enclosure to accommodate these machinery portions and the sound deadening acoustic lining without increasing the size and volume of the enclosure 10. Since an increased enclosure size is not permitted (the appliance would exceed the permitted architectural design space) the interior volume and space within the appliance is used to position components close to the wall of the enclosure that previously required the removal of insulation linings. The present invention addresses the problem of sound propagation by closing the openings in the acoustic lining through caps or inserts such as those shown at 28 and 29, respectively. The caps or inserts are constructed of material of identical constituents and recipe as the insulation material but having a different density, and thus weight per square foot, and compressed into a thin layer that may be cemented to adjacent insulation material to cover the openings otherwise required by the protruding machine portions.

The caps or inserts incorporate the same constituents as the acoustic lining material including appropriate fire resistance characteristics. Thus, the incorporation of a fibrous web or sheet as described above is provided as an acoustic lining throughout the interior of the appliance enclosure. Those openings required by the components or machinery within the enclosure that extend beyond the interior surface 31 of the sound absorbing material liner 26 and closer to the enclosure wall 30 necessitate the removal or opening of the insulation material; however, the material with which the sound insulation lining is made, is subjected to the process above described to reduce the thickness of the insulating sheet to approximately 4 mm thickness having a lower density and secured over the necessary opening in the adjacent insulating sheet. The result is a continuous insulating layer of sound absorbing materials throughout substantially the entire interior of the applicant enclosure including those portions of the interior containing machinery or equipment that necessarily must approach the exterior of the enclosure that would otherwise preclude sound deadening material.

Figure 4:
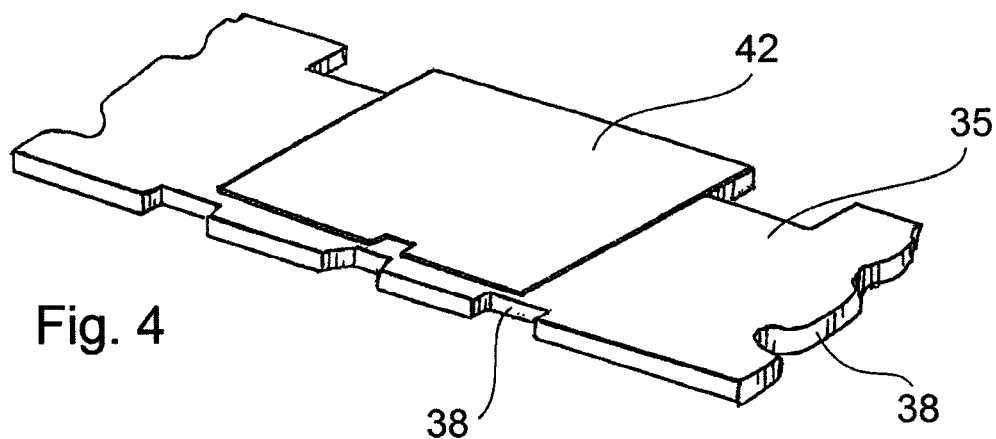
FIG. 4 is a perspective schematic representation of the sound insulation sheet of FIG. 3 incorporating a cap in accordance with the teachings of the present invention.
Figure 3:
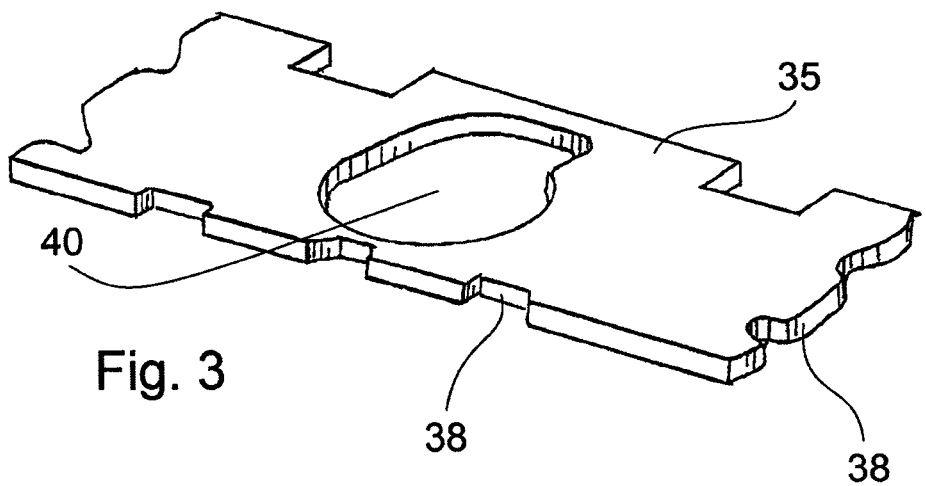
FIG. 3 is a perspective of a portion of a sample sheet of sound insulation material utilized in the system of the present invention.

Referring to FIGS. 3 and 4, another example of the sound deadening technique of the present invention is shown. A sheet of sound absorbing lining material 35 is shown having a shape to conform to the requirements of the interior surface of an appliance enclosure wall. Edges 38 of the sheet may conform to necessary structural components of the enclosure such as internal bracing and the like. The acoustic sheet or lining 35 abutted at the corners thereof by a similar sheet of sound absorbing material, usually perpendicularly as shown in FIG. 1 to effectively encase the interior of the enclosure in sound absorbing material. An opening 40 is provided in the sound absorbing material 35 to accommodate internal functional equipment such as electric motors, hydraulic valves, and various other internal components. These components require additional space beyond that available within the sheets of the sound absorbing material but within the total space available within the appliance enclosure. Sound emanating from the internal components may thus escape through the opening 40; although the interior of the appliance is effectively covered with sound absorbing material, openings such as the opening 40 permit a portion of the sound (noise) to escape. The result of such escape is the propagation of objectionable sound from the appliance as it is operating; although the sound is attenuated by the acoustic insulation, the openings nevertheless permit a portion of the sound to escape. The present invention addresses this issue by providing a cap 42 as described above. The cap is thin (4 mm in the embodiment chosen for illustration) and can effectively close the opening 40. The cap is formed of the identical recipe as the sheet of sound absorbing material 35 but is formed of the material of a different density. The cap may be secured over the opening 40 in any convenient manner such as cementing the cap in position to the sound absorbing material 35.

The present invention has been described in terms of selected specific embodiments of the apparatus and method incorporating details to facilitate the understanding of the principles of construction and operation of the invention. Such reference herein to a specific embodiment and details thereof is not intended to limit the scope of the claims appended hereto. It will be apparent to those skilled in the art that modifications may be made in the embodiments chosen for illustration without departing from the spirit and scope of the invention.

What is claimed:

1. A sound attenuating system for reducing sound emanating from an enclosure containing mechanical components comprising:
   (a) an enclosure having enclosure walls for enclosing mechanical components;
   (b) a sheet of sound absorbing material of predetermined constituents and having a predetermined thickness contacting an interior surface of said enclosure walls and exposed to said mechanical components;
   (c) an opening in said sheet of sound absorbing material to permit a portion of the mechanical components mounted within said enclosure to be positioned closer to an interior surface of said enclosure walls; and
   (d) a cap of sound absorbing material of said predetermined constituents having a thickness less than said predetermined thickness, secured over said opening.

2. The sound attenuating system of claim 1 wherein said sheet of sound absorbing material and said cap are made of the same predetermined constituents but said cap is compressed to a thickness less than said sheet of sound absorbing material.

3. The sound attenuating system of claim 1 wherein said sheet of sound absorbing material comprises a bi-component fiber comprising approximately 80% of a natural fiber such as cotton, and approximately 20% of a binder fiber such as polyester and wherein said cap comprises a material having the same recipe as said sheet but having a different density.

4. The sound attenuating system of claim 1 wherein said sheet of sound absorbing material is provided with a fire retardant including an ammonium sulfate/boric acid/urea combination applied to the natural fiber.

5. The sound attenuating system of claim 1 wherein said sheet of sound absorbing material comprises natural fiber such as cotton containing 25% to 75% ammonium sulfate, 10% to 30% boric acid, and 10% to 30% urea to provide an LOI index of at least 24.

6. A method for attenuating or reducing sound emanating from an enclosure containing mechanical components comprising:
   (a) providing an enclosure having enclosure walls for enclosing mechanical components;
   (b) providing a sheet of sound attenuating material comprising approximately 80% natural fiber such as cotton and approximately 20% binder fiber such as polyester and incorporating a fire retardant and forming said sheet to approximately 20 mm in thickness;
   (c) providing openings in said sheet of sound absorbing material to permit portions of the mechanical components mounted within said enclosure to be positioned closer to an interior surface of said enclosure walls;
   (d) forming a cap of material having the same recipe as said sheet of sound absorbing material having a thickness of approximately 38 mm and having a weight of approximately 44 gms per square foot;
   (e) compressing said cap to approximately 4 mm in thickness and subjecting the compressed cap to heat from approximately 350° F. to 450° F. for 1 to 3 minutes;
   (f) cooling said compressed cap to a temperature below to approximately 265° F.;
   (g) mounting said compressed cap on said sheet of absorbing material over said opening;

whereby, said sound insulation comprises a sheet of sound absorbing material having openings provided therein and wherein said caps of the same material as said sound absorbing material but having a lower density are secured to said sound deadening material over said openings.

* * * * *